US011352465B2

(12) United States Patent
Chen et al.

(10) Patent No.: US 11,352,465 B2
(45) Date of Patent: Jun. 7, 2022

(54) ELASTOMER COMPOUNDS

(71) Applicant: Cabot Corporation, Boston, MA (US)

(72) Inventors: Limeng Chen, Arlington, MA (US);
Jaesun Choi, Daejeon (KR);
Agathagelos Kyrlidis, Cambridge, MA (US); Oliver W. Tassinari, Boston, MA (US)

(73) Assignee: Cabot Corporation, Boston, MA (US)

( * ) Notice: Subject to any disclaimer, the term of this patent is extended or adjusted under 35 U.S.C. 154(b) by 306 days.

(21) Appl. No.: 16/076,362

(22) PCT Filed: Jan. 30, 2017

(86) PCT No.: PCT/US2017/015578
§ 371 (c)(1),
(2) Date: Aug. 8, 2018

(87) PCT Pub. No.: WO2017/139115
PCT Pub. Date: Aug. 17, 2017

(65) Prior Publication Data
US 2019/0040211 A1 Feb. 7, 2019

Related U.S. Application Data

(60) Provisional application No. 62/293,449, filed on Feb. 10, 2016.

(51) Int. Cl.
| | | |
|---|---|---|
| *C08J 3/22* | (2006.01) | |
| *C08K 3/04* | (2006.01) | |
| *C08J 3/21* | (2006.01) | |
| *C08L 9/02* | (2006.01) | |
| *C08L 27/16* | (2006.01) | |

(52) U.S. Cl.
CPC .............. *C08J 3/226* (2013.01); *C08J 3/21* (2013.01); *C08K 3/04* (2013.01); *C08K 3/042* (2017.05); *C08L 9/02* (2013.01); *C08L 27/16* (2013.01); *C08J 2307/00* (2013.01); *C08J 2309/02* (2013.01); *C08J 2311/00* (2013.01); *C08J 2327/12* (2013.01); *C08J 2327/20* (2013.01); *C08J 2427/20* (2013.01); *C08K 2201/006* (2013.01); *C08K 2201/011* (2013.01); *C08K 2201/014* (2013.01)

(58) Field of Classification Search
CPC . C08J 3/21; C08J 3/226; C08J 2427/20; C08J 2327/12; C08J 2311/00; C08J 2309/02; C08J 2307/00; C08J 2327/20; C08K 3/042; C08K 3/04; C08K 2201/011; C08K 2201/014; C08K 2201/006; C08L 9/02; C08L 27/16
See application file for complete search history.

(56) References Cited

U.S. PATENT DOCUMENTS

| | | | |
|---|---|---|---|
| 5,916,934 A | 6/1999 | Mahmud et al. | |
| 2010/0256294 A1* | 10/2010 | Ikeda | C08K 5/18 524/559 |
| 2013/0310495 A1* | 11/2013 | Kim | H01B 3/025 524/106 |
| 2016/0035456 A1 | 2/2016 | Sauro et al. | |

FOREIGN PATENT DOCUMENTS

| | | |
|---|---|---|
| CN | 103122085 A | 5/2013 |
| CN | 103224656 A | 7/2013 |
| CN | 103408855 A | 11/2013 |
| CN | 105037830 A | 11/2015 |
| CN | 105175954 A | 12/2015 |
| CN | 104558727 B | 5/2016 |
| WO | WO 2010/016976 A1 | 2/2010 |
| WO | WO 2013/090464 A1 | 6/2013 |
| WO | WO 2016/023023 A1 | 2/2016 |
| WO | WO 2017/029072 A1 | 2/2017 |

OTHER PUBLICATIONS

The International Search Report and The Written Opinion of the International Searching Authority, or the Declaration of International Application No. PCT/US2017/015578, dated Apr. 18, 2017.
"Basics of Rubber Technology", Society of Rubber Science and Technology, Oct. 1, 2014, pp. 104-105.
JSR BUTYL, JSR Corporation, Aug. 2017, pp. 1-14.
Mensah, et al., "A Study of Graphene Oxide-Reinforced Rubber Nanocomposite", *J. Appl. Polym. Sci.* 2014, 131, 40640.

* cited by examiner

*Primary Examiner* — Angela C Scott

(57) ABSTRACT

Disclosed herein are elastomer compounds comprising: at least one elastomer that is resistant to heat for 70 h at 100° C. such that the at least one elastomer exhibits at least one of the following properties selected from: (a) a change in durometer hardness of no more than 15 points, (b) a change in tensile strength of no more than 40%, and (c) a change in ultimate elongation of no more than 40% The elastomer compound further comprises at least one graphene-based material present in an amount ranging from 0.01 phr to 30 phr relative to the at least one elastomer and at least one carbon black present in an amount ranging from 15 phr to 150 phr relative to the at least one elastomer. Also disclosed are methods of making such compounds, and articles comprising elastomer compounds.

12 Claims, No Drawings

ELASTOMER COMPOUNDS

CROSS REFERENCE TO RELATED APPLICATIONS

This application is a national phase application of and claims priority to PCT/US2017/015578, filed on Jan. 30, 2017, which claims priority to U.S. Provisional Patent Application No. 62/293,449, filed on Feb. 10, 2016. Both applications are incorporated by reference in their entirety.

FIELD OF THE INVENTION

Disclosed herein are elastomer compounds comprising at least one graphene-based material and at least one carbon black.

BACKGROUND

Components made of elastomer compounds are used in various industries for functions such as sealing, insulation, vibration damping, and fluid delivery. In several industries, such components function under high temperature conditions. Certain elastomer compounds are also subjected to chemical attacks from different organic solvents, water steam, acid gas, base solution, and other harsh chemicals. As a result, there remains a need to develop elastomer compounds having at least one of thermal stability and chemical resistance.

SUMMARY

One embodiment provides an elastomer compound comprising:
at least one elastomer that is resistant to heat for 70 h at 100° C. such that the at least one elastomer exhibits at least one of the following properties selected from:
  (a) a change in durometer hardness of no more than 15 points,
  (b) a change in tensile strength of no more than 40%, and
  (c) a change in ultimate elongation of no more than 40%;
at least one graphene-based material present in an amount ranging from 0.01 phr (per 100 parts of rubber) to 30 phr relative to the at least one elastomer; and
at least one carbon black present in an amount ranging from 15 phr to 150 phr relative to the at least one elastomer.

Another embodiment provides a method of making an elastomer compound comprising:
combining at least one elastomer with at least one graphene-based material and at least one carbon black to form the elastomer compound,
wherein the at least one elastomer is resistant to heat for 70 h at 100° C. such that the at least one elastomer exhibits at least one of the following properties selected from:
  (a) a change in durometer hardness of no more than 15 points,
  (b) a change in tensile strength of no more than 40%, and
  (c) a change in ultimate elongation of no more than 40%,
  wherein the at least one graphene-based material is present in an amount ranging from 0.1 phr to 3 phr relative to the at least one elastomer; and
  wherein the at least one carbon black is present in an amount ranging from 15 phr to 150 phr relative to the at least one elastomer.

DETAILED DESCRIPTION

For elastomer components to function properly at high temperature and/or under harsh chemical environments, it is desired to use elastomer compounds having sufficiently one or more of strong mechanical properties at high temperature and degradation resulting from chemical attacks should be limited. Service temperatures can depend on the elastomers and reinforcement additive, among other factors. Selection of these components can change and potentially enhance the properties of elastomer compounds at high temperatures and allow these compounds to be used at temperatures above their typical service temperature.

Carbon black is typically used as a filler for industrial elastomers because of the balanced properties that it can provide to elastomer compounds. Carbon blacks with high surface area and high structure can impart high modulus and hardness; however, the viscosity of such elastomer compounds tends be high, which can lead to poor processibility. In addition, high structure carbon blacks may have limited capability to enhance mechanical properties of high temperature elastomer compounds.

It has been discovered that new carbon-based reinforcing additives can enhance mechanical properties and/or chemical resistance of high temperature elastomer compounds. In one embodiment, a mixture of graphene-based materials and carbon blacks as reinforcing additives can enhance one or more mechanical and chemical properties of elastomer compounds. For example, elastomer compounds with graphene-based materials/carbon black mixtures can provide a greater tensile modulus than the tensile modulus of elastomer compounds with carbon blacks as the single additive at equal amounts of the total loading of carbon additives. In another example, the tensile strength of elastomer compounds with mixtures of graphene-based materials and carbon black can provide tensile strengths greater than the tensile strength of elastomer compounds with graphene as the single additive.

Accordingly, disclosed herein are elastomer compounds comprising:
at least one elastomer that is resistant to heat for 70 h at 100° C. such that the at least one elastomer exhibits at least one of the following properties selected from:
  (a) a change in durometer hardness of no more than 15 points,
  (b) a change in tensile strength of no more than 40%, and
  (c) a change in ultimate elongation of no more than 40%;
at least one graphene-based material present in an amount ranging from 0.01 phr (parts per hundred rubber) to 30 phr relative to the at least one elastomer; and
at least one carbon black present in an amount ranging from 15 phr to 150 phr relative to the at least one elastomer.

As used herein, elastomer compounds refer to a homogeneous mixture (e.g., blend) of the at least one elastomer, at least one graphene-based material, and at least one carbon black. Stated alternatively, the at least one graphene-based material and at least one carbon black are homogeneously dispersed within the at least one elastomer; the elastomer compounds do not comprise separate layers of elastomer, graphene-based materials or carbon black. In one embodiment, the at least one graphene-based material and at least one carbon black are particulate. The homogeneous mixture can be achieved by various methods known in the art, e.g., solution processing (elastomer in solution combined with graphene-based material and carbon black powders or as a dispersion or slurry), or processing the at least one elastomer with the graphene-based material and carbon black powders, e.g., at elevated temperatures and/or mixing, as described in further detail herein.

In one embodiment, the at least one elastomer is resistant to heat for 70 h at 100° C., such that the at least one elastomer exhibits at least one of the following properties:

(a) a change in durometer hardness of no more than 15 points,
(b) a change in tensile strength of no more than 40%, and
(c) a change in ultimate elongation of no more than 40%.

The change in properties (a) to (c) can be determined by taking measurements of the at least one elastomer before and heating at 100° C. for 70 h, e.g., according to ASTM D573. In one embodiment, after being subjected to 100° C. for 70 h. In one embodiment, the change in durometer hardness is no more than 10 points. In another embodiment, the change in tensile strength is no more than 35%, e.g., no more than 30%, or no more than 25%. In another embodiment, the change in ultimate elongation is no more than 35%, e.g., no more than 30%, or no more than 25%. Durometer hardness can be determined according to ASTM D2240. Tensile strength properties can be determined according to ASTM D412. Ultimate elongation can be determined according to ASTM D412.

In one embodiment, after being subjected to 100° C. for 70 h, the at least one elastomer exhibits two of the properties (a) to (c). In another embodiment, after being subjected to 100° C. for 70 h, the at least one elastomer exhibits each of the properties (a) to (c).

In one embodiment, the at least one elastomer is selected from rubbers (natural or synthetic) and polymers (e.g., homopolymers, copolymers, and/or blends) comprising at least one monomer selected from 1,3-butadiene, styrene, isoprene, isobutylene, 2,3-dialkyl-1,3-butadiene, acrylonitrile, ethylene, and propylene, where alkyl is selected from $C_1$-$C_6$ alkyls. Exemplary elastomers include those selected from polychloroprene rubber (CR), acrylonitrile butadiene rubber (NBR), hydrogenated acrylonitrile butadiene rubber (HNBR), fluoroelastomers (FKM, e.g., Viton® fluoroelastomers from DuPont or Dyneon™ fluoropolymers from 3M) and perfluoroelastomers (FFKM), Aflas® tetrafluoroethylene/propylene dipolymers (FEPM) from Asahi Glass, ethylene/acrylic elastomers (AEM), polyacrylates (ACM), polyisoprene, ethylene-propylene rubber, high temperature styrene-butadiene rubber.

In one embodiment, the at least one graphene based material is selected from graphenes, graphene oxides, and reduced graphene oxides. "Graphene" as used herein comprises at least one single-atom thick sheet of $sp^2$-hybridized carbon atoms bonded to each other to form a honey-comb lattice. Graphenes can include single layer graphenes, few layer graphenes, and/or graphene aggregates. In one embodiment, the graphene comprises few-layer graphenes (FLG) having 2 or more stacked graphene sheets, e.g., a 2-50 layer graphene. In one embodiment, the graphene can include single-layer graphene and/or 2-20 layer graphene (or other ranges disclosed herein). In another embodiment, the graphene comprises 3-15 layer graphene.

The dimensions of graphenes are typically defined by thickness and lateral domain size. Graphene thickness generally depends on the number of layered graphene sheets. The dimension transverse to the thickness is referred to herein as the "lateral" dimension or domain. In one embodiment, the graphene has a lateral domain size ranging from 10 nm to 10 µm, e.g., from 10 nm to 5 µm, from 10 nm to 2 µm, from 100 nm to 10 µm, from 100 nm to 5 µm, from 100 nm to 2 µm, from 0.5 µm to 10 µm, from 0.5 µm to 5 µm, from 0.5 µm to 2 µm, from 1 µm to 10 µm, from 1 µm to 5 µm, or from 1 µm to 2 µm.

The graphenes can exist as discrete particles and/or as aggregates. "Aggregates" refers to a plurality of graphene particles (platelets) comprising few layer graphenes that are adhered to each other. For graphene aggregates, "lateral domain size" refers to the longest indivisible dimension or domain of the aggregate. Thickness of the aggregates is defined as the thickness of the individual graphene particle. Graphene aggregates can be generated mechanically, e.g., by exfoliation of graphite.

Graphenes can be generated by various methods, including exfoliation of graphite (mechanically, chemically) as well known in the art. Alternatively, graphenes can be synthesized through the reaction of organic precursors such as methane and alcohols, e.g., by gas phase, plasma processes, and other methods known in the art.

"Graphene oxide" as used herein refers to oxidized graphenes having a carbon-to-oxygen atomic ratio of at least 1.5:1, at least 2:1, at least 2.5:1, at least 3:1, at least 3.5:1, at least 4:1, and at least 4.5:1. In one embodiment, the carbon-to-oxygen atomic ratio ranges from 1.5:1 to 5:1, from 2:1 to 5:1, or from 3:1 to 5:1. The carbon to oxygen molar ratio can be determined by elemental analysis, or other methods known in the art. Like graphenes, graphene oxides can exist as a monolayer or as few layer stacks (e.g., from 2-50, 2-20, or 3-15 layers). Graphene oxides can be obtained by exfoliating graphite oxide or by oxidizing graphenes.

"Reduced graphene oxides" as used herein refers to the product of reducing graphene oxides or graphite oxides. Graphene oxides or graphite oxides can be reduced by various methods e.g., chemically, thermally, etc. In one embodiment, reduced graphene oxides have a carbon-to-oxygen molar ratio of at least 5:1. In another embodiment, reduced graphene oxides have a carbon-to-oxygen molar ratio ranging from 2:1 to 1000:1, from 2:1 to 100:1, from 2:1 to 20:1, from 2:1 to 10:1, from 3:1 to 1000:1, from 3:1 to 100:1, from 3:1 to 20:1, from 3:1 to 10:1, from 5:1 to 1000:1, from 5:1 to 100:1, from 5:1 to 20:1, or from 5:1 to 10:1.

In one embodiment, the surface area of the at least one graphene-based material is a function of the number of sheets stacked upon each other and can be calculated based on the number of layers. In one embodiment, the at least one graphene-based material has no microporosity. For example, the surface area of a graphene monolayer with no porosity is 2700 $m^2$/g. The surface area of a 2-layer graphene with no porosity can be calculated as 1350 $m^2$/g. In another embodiment, the surface area of the at least one graphene-based material results from the combination of the number of stacked sheets and amorphous cavities or pores. In one embodiment, the at least one graphene-based material has a microporosity ranging from greater than 0% to 50%, e.g., from 20% to 45% or from 20% to 30%. In one embodiment, the at least one graphene-based material is selected from graphenes and reduced graphene oxides and has a BET surface area ranging from 40 to 1600 $m^2$/g as determined by ASTM-D6556, from 60 to 1000 $m^2$/g, or a BET surface area ranging from 80 to 800 $m^2$/g, e.g., from 200 to 800 $m^2$/g.

In one embodiment, the at least one graphene-based material present in an amount ranging from 0.01 phr to 30 phr, e.g., from 0.1 phr to 30 phr relative to the at least one elastomer. In one embodiment, the at least one graphene-based material is present in an amount ranging from 0.01 phr to 20 phr from 0.1 phr to 20 phr or from 0.5 phr to 20 phr, from 0.01 phr to 20 phr, from 0.1 phr to 10 phr or from 0.5 phr to 10 phr relative to the at least one elastomer.

In one embodiment, the at least one carbon black is present in an amount ranging from 15 phr to 150 phr relative to the at least one elastomer, e.g., from 15 phr to 100 phr, from 15 phr to 70 phr, from 20 phr to 150 phr, from 20 phr to 100 phr, from 20 phr to 70 phr, from 25 phr to 150 phr, from 25 phr to 100 phr, from 25 phr to 70 phr, from 30 phr to 150 phr, from 30 phr to 100 phr, or from 30 phr to 70 phr relative to the at least one elastomer.

In one embodiment, the at least one graphene-based material is present in an amount ranging from 0.01 phr to 30 phr (e.g., from 0.1 phr to 30 phr or other ranges disclosed herein) relative to the at least one elastomer and the at least one carbon black is present in an amount ranging from 20 to 150 phr, e.g., from 30 to 150 phr, relative to the at least one elastomer.

In one embodiment, the total loading of graphene-based materials plus carbon black ranges from 15 phr to 150 phr, e.g., from 15 phr to 100 phr, from 15 phr to 75 phr, from 15 phr to 50 phr, or from 15 phr to 30 phr.

In one embodiment where the at least one graphene-based material is selected from graphene oxides and reduced graphene oxides, the amount of carbon black is greater than the amount of graphene, e.g., the weight ratio of the at least one graphene-based material (selected from graphene oxides and reduced graphene oxides) to carbon black ranges from 1:2 to 1:1000, from 1:2 to 1:100, from 1:2 to 1:75, from 1:2 to 1:50, from 1:3 to 1:1000, from 1:3 to 1:100, from 1:3 to 1:75, from 1:3 to 1:50, from 1:5 to 1:1000, from 1:5 to 1:700, from 1:5 to 1:75, or from 1:5 to 1:50. In one embodiment where the graphene-based material is graphene, the e.g., the weight ratio of graphene:carbon black ranges from 3:1 to 1:1000, from 3:1 to 1:100, from 3:1 to 1:75, from 3:1 to 1:50, from 2:1 to 1:1000, from 2:1 to 1:100, from 2:1 to 1:75, from 2:1 to 1:50, from 1:1 to 1:1000, from 1:1 to 1:100, from 1:1 to 1:75, from 1:1 to 1:50, from 1:2 to 1:1000, from 1:2 to 1:100, from 1:2 to 1:75, from 1:2 to 1:50, from 1:3 to 1:1000, from 1:3 to 1:100, from 1:3 to 1:75, from 1:3 to 1:50, from 1:5 to 1:1000, from 1:5 to 1:700, from 1:5 to 1:75, or from 1:5 to 1:50.

In one embodiment, the at least one carbon black has an OAN ranging from 30 to 130 cm$^3$/100 g, from 40 to 130 cm$^3$/100 g, e.g., from 30 to 120 cm$^3$/100 g, from 40 to 120 cm$^3$/100 g, from 30 to 110 cm$^3$/100 g, or from 40 to 110 cm$^3$/100 g. OAN can be determined according to ASTM D2414.

In one embodiment, the at least one carbon black has a statistical thickness surface area (STSA) ranging from 3 to 200 m$^2$/g, from 3 to 150 m$^2$/g, from 3 to 125 m$^2$/g, from 3 to 100 m$^2$/g, from 5 to 200 m$^2$/g, from 5 to 150 m$^2$/g, from 5 to 125 m$^2$/g, from 5 to 100 m$^2$/g, from 7 to 200 m$^2$/g, from 7 to 150 m$^2$/g, from 7 to 125 m$^2$/g, or from 7 to 100 m$^2$/g. STSA can be determined according to ASTM-D6556.

The at least one carbon black can be selected from those used for rubber reinforcing. Exemplary carbon blacks include those sold under the Regal®, Black Pearls®, Spheron®, Sterling®, and Vulcan® trademarks available from Cabot Corporation, the Raven®, Statex®, Furnex®, and Neotex® trademarks, the CD and HV lines available from Birla Carbon, and carbon blacks sold under the Corax®, Durax®, Ecorax®, and Purex® trademarks, the CK line available from Orion Engineered Carbons, and carbon blacks sold under the Thermax® trademarks available from Cancarb Ltd. Exemplary carbon blacks include ASTM N100 series to N900 series carbon blacks, e.g., N300 series carbon blacks, N500 series carbon blacks, N600 series carbon blacks, N700 series carbon blacks, and N900 series carbon blacks, such as N330, N326, N339, N539, N550, N660, N774, and N990 carbon blacks.

The compounds can further comprise at least one additive selected from coupling agents, vulcanizing agents, curing agents, antioxidants, antiozonants, plasticizers, processing aids (e.g., liquid polymers, oils), resins, flame-retardants, extender oils, lubricants, oil extenders, and antidegradents. In one embodiment, the at least one additive is selected from metal oxides such as zinc oxide, stearic acid, vulcanizing agents, curing agents, plasticizers, antioxidants, and accelerators. Each additive can be present in an amount ranging from 0.1 to 10 phr relative to the amount of the at least one elastomer, e.g., an amount ranging from 0.1 to 5 phr, 0.1 to 3 phr, or an amount ranging from 0.1 to 2 phr relative to the amount of the at least one elastomer.

The elastomer compounds disclosed herein can be used in the manufacture of various articles in sealing, insulation, vibration damping, and fluid delivery applications. One embodiment provides an article comprising the elastomer compounds disclosed herein. Exemplary articles include o-ring seals and sealants, gaskets, diaphragms, valves, hydraulic seals, swell packers, blow out preventers, oil resistant hose liners. Other examples of articles include those used under the hoods of automobiles where the articles may operate at high temperatures, and to perform cooler, high thermal conductivity is desirable to dissipate heat effectively. Such articles include wire harnesses, battery cables, turbo hoses, molded air ducts, brake parts, grommets, hydraulic and radiator hoses, transmission seals and gaskets, engine and chassis vibration mounts, constant velocity joint boots, engine seals, and fuel system components. These and other articles can have applications in the oil/gas, aerospace, and automotive industries. The articles disclosed herein can have beneficial properties to enhance one or more of high sealing efficiency at service temperature, high rapid gas decompression (RGD) resistance, and high extrusion resistance.

Also disclosed herein are methods of making elastomer compounds. The at least one elastomer, at least one graphene-based material, and at least one carbon black can be combined by any method known in the art. The components can be added sequentially or simultaneously with solution mixing or dry mixing techniques.

The dried masterbatch can be masticated in an internal mixer (e.g., a C. W. Brabender internal mixer) at temperatures of at least 20° C., such as temperatures ranging from 20° C. to 100° C. or from 30° C. to 60° C. The masterbatch can be masticated for at least 30 s, at least 1 min, or at least 50 min.

The carbon black can be added to the masticated masterbatch as a powder or slurry followed by mastication for at least 1 min., e.g., at least 2 min. Other additives can then be added and the resulting mixture masticated as described herein, where the other additives can be one or more of coupling agents, vulcanizing agents, curing agents, antioxidants, antiozonants, plasticizers, processing aids resins, flame-retardants, extender oils, lubricants, oil extenders, and antidegradents.

The resulting elastomer compound can be rolled into sheets (e.g., with a roll mill) to remove voids in the masterbatch.

In another embodiment, addition of the carbon black and additives to the masterbatch can be performed with a two-stage process. For example, addition of carbon black to the graphene-based material/elastomer masterbatch can be performed as described above, followed by addition of metal oxide, plasticizer, antioxidants and/or accelerator as described above. The resulting compound can be roll milled and then reintroduced into the mixing chamber and masticated under the conditions described herein. Curing agents can be added and the mixture masticated.

After the compound is roll milled (with a single-stage or two-stage process), articles comprising the compound can be formed by curing the compound in a mold, optionally with a hydraulic press. Post-curing processes can also optionally be performed.

In another embodiment, the at least one graphene-based material and at least one carbon black can be combined with the elastomer solution. In another embodiment, the graphene-based material and the at least one carbon black can be combined with the elastomer by using dry mixing techniques. In yet another embodiment, the procedure described above can be performed with a carbon black/elastomer masterbatch.

EXAMPLES

The compound was prepared with a graphene-based material/elastomer masterbatch that was initially prepared by solution mixing. The resulting masterbatch was combined with, via a two-stage mixing process, neat rubber, carbon black, and other additives (e.g., one or more of metal oxide, plasticizer, antioxidant, accelerator, and curing agents). The actual components used, amounts added, and other reaction conditions are provided in the specific examples.

Example 1: Preparation of Graphene-Based Material/NBR Masterbatch

The graphene-based materials used in the masterbatch preparation were reduced graphene oxides (rGO) prepared by reducing a graphite oxide suspension. Additional details can be found in U.S. Prov. Appl. No. 62/113,106, filed Feb. 6, 2015, the disclosure of which is incorporated herein by reference.

The elastomer acrylonitrile butadiene rubber ("NBR"; 300 g, Nipol® DN3380 elastomer, Zeon Chemicals) was cut into small pieces in cubical shapes with an edge length of 1 cm. The NBR pieces were mixed with acetone in a weight ratio of 10:100. The NBR/solvent mixture was stirred with an overhead shaft stirrer until all the NBR was fully dissolved in the solvent. The stirring speed of the overhead mixer ranged from 100 to 300 rpm over a time period ranging from 24 h to 48 h.

The rGO (19.5 g) was added to the NBR solution (containing 300 g NBR) to provide an rGO:NBR weight ratio of 6.5:100. This mixture was stirred at speeds ranging from 100 to 300 rpm over a time period ranging from 20 min to 40 min.

De-ionized water was then added to the rGO/NBR solution mixture while the mixture was stirred by the overhead shaft mixer at 300 rpm. The rGO/NBR masterbatch precipitated out of the water/solvent mixture upon achieving a water/acetone ratio of about 2:1.

Excess water and solvent trapped inside the masterbatch was removed by squeezing the masterbatch in a polypropylene bag followed by drying masterbatch in a well-ventilated hood at room temperature for 72 h and then was further dried in a vacuum oven at 60° C. under vacuum for 48 h.

A C. W. Brabender internal mixer was preheated to 50° C. The masterbatch was then fed into the mixing chamber and masticated for approximately 5 min at 50 rpm to form the resulting rGO/NBR masterbatch.

A masterbatch containing HNBR and rGO can be made in the same manner.

Example 2: Preparation of rGO/FKM Masterbatch

A fluoroelastomer ("FKM"; 300 g, Viton® GF-600S fluoroelastomer, DuPont) was cut into small pieces in cubical shapes with an edge length of 1 cm. The FKM pieces were mixed with acetone in a weight ratio of 20:100. The FKM/solvent mixture was stirred with an overhead shaft stirrer until all the FKM was fully dissolved in the solvent. The stirring speed of the overhead mixer ranged from 100 to 300 rpm over a time period ranging from 24 h to 48 h.

The rGO (18 g) was added to the FKM solution (containing 300 g FKM) to provide an rGO:FKM weight ratio of 6:100. This mixture was stirred at speeds ranging from 100 to 300 rpm over a time period ranging from 20 min to 40 min.

De-ionized water was then added to the rGO/FKM solution mixture while the mixture was stirred by the overhead shaft mixer at 300 rpm. The rGO/FKM masterbatch precipitated out of the water/solvent mixture upon achieving a water/acetone ratio of about 2:1.

Excess water and solvent trapped inside the masterbatch was removed by squeezing the masterbatch in a polypropylene bag followed by drying masterbatch in a well-ventilated hood at room temperature for 72 h and then was further dried in a vacuum oven at 60° C. under vacuum for 48 h.

A C. W. Brabender internal mixer was preheated to 50° C. The masterbatch was then fed into the mixing chamber and masticated for approximately 5 min at 50 rpm to form the resulting rGO/FKM masterbatch.

Example 3: Preparation of Compounds Comprising Acrylonitrile Butadiene Rubber (NBR)

This Example describes processes for preparing compounds comprising NBR. Rubber compounds with the following as reinforcing fillers were evaluated: carbon black only ("Control CB Sample 1"), rGO only ("Control rGO Sample"), and an rGO/NBR/CB compound containing a mixture of carbon black and rGO ("Sample A"). The amount of each added component is listed in Table 1, expressed as weight (g).

TABLE 1

| Component | Control CB Sample 1 | Control rGO Sample | Sample A |
| --- | --- | --- | --- |
| NBR neat polymer | 37.33 | 0 | 0 |
| rGO/NBR masterbatch | 0 | 48.39 | 39.82 |
| carbon black | 18.66 | 0 | 16.26 |
| ZnO | 1.87 | 2.27 | 1.87 |
| Stearic Acid | 0.37 | 0.45 | 0.37 |
| Antioxidant(s) | 0.75 | 0.91 | 0.75 |
| Plasticizer | 1.87 | 2.27 | 1.87 |
| Sulfur | 0.33 | 0.43 | 0.35 |
| Accelerator | 0.24 | 0.32 | 0.27 |

Stage 1: The mixing chamber of a C. W. Brabender 3-piece mixer with roller blades was preheated to 50° C. For Sample A, the rGO/NBR masterbatch of Example 1 was fed into the mixing chamber followed by the addition of the neat NBR. The masterbatch and neat NBR mixture was masticated for approximately 30 seconds at a mixing speed of 60 rpm. Then carbon black (Sterling® 6630 carbon black, ASTM N550, Cabot Corporation)) was added slowly to the mixing chamber. After all carbon black was added, the mixture was further masticated for approximately 2.5 minutes. Zinc oxide, bis[2-(2-butoxyethoxy)ethyl] adipate (Sigma-Aldrich) as the plasticizer, and stearic acid were then added to the mixing chamber. The mixture was further masticated for about 2 minutes. The resulting compound was removed from the mixing chamber and milled into sheets having a thickness of 0.25 in by a two-roll mill at elevated temperature; the temperature of the mill was typically set at 50° C.

Stage 2: The mixing chamber was preheated to 50° C. as in stage 1. The resulting sheets from stage 1 were fed into the mixing chamber and masticated for approximately 30 seconds at a mixing speed of 60 rpm. Sulfur and CBTS (N-cyclohexyl-2-benzothiazole sulfenamide, Akrochem Corporation) as the accelerator were then added to the mixing chamber, and the mixture was masticated with the rubber compound inside the chamber for approximately 2 minutes. The compound was removed from the chamber and milled into sheets (thickness of 0.25 in) using a two roll mill at 50° C.

CB sample 1 was prepared using the following method: The mixing chamber of a C. W. Brabender 3-piece mixer with roller blades was preheated to 50° C. Neat NBR was fed into the mixing chamber and masticated for approximately 30 s at a mixing speed of 60 rpm. Carbon black (Sterling® 6630 carbon black, ASTM N550, Cabot Corporation)) was added slowly to the mixing chamber and the mixture was masticated for approximately 2.5 min. Zinc oxide, bis[2-(2-butoxyethoxy)ethyl] adipate (Sigma-Aldrich) as the plasticizer, and stearic acid were then added to the mixing chamber, and the mixture was masticated for about 2 min. The resulting compound was removed from the mixing chamber and milled into sheets having a thickness of 0.25 in by a two-roll mill at elevated temperature; the temperature of the mill was typically set at 50° C.

Control rGO sample was prepared using the following method: The mixing chamber of a C. W. Brabender 3-piece mixer with roller blades was preheated to 50° C. Neat NBR was fed into the mixing chamber. The rGO/NBR masterbatch of Example 1 was then added and this mixture was masticated for approximately 3 min at a mixing speed of 60 rpm. Zinc oxide, bis[2-(2-butoxyethoxy)ethyl] adipate (Sigma-Aldrich) as the plasticizer, and stearic acid were added to the mixing chamber, and the mixture was further masticated for about 2 min. The resulting compound was removed from the mixing chamber and milled into sheets having a thickness of 0.25 in by a two-roll mill at elevated temperature; the temperature of the mill was typically set at 50° C.

The compounds were cured by using a hydraulic press at 150° C. with a ram pressure of 2500 psi. Table 2 lists the components by weight per 100 parts of rubber (phr) in the compounds.

TABLE 2

| Component | Control CB Sample 1 | Control rGO Sample | Sample A |
|---|---|---|---|
| NBR | 100 | 100 | 100 |
| rGO | 0 | 6.5 | 6.5 |
| carbon black | 50 | 0 | 43.5 |
| ZnO | 5 | 5 | 5 |
| Stearic Acid | 1 | 1 | 1 |
| Antioxidant(s) | 2.0 | 2.0 | 2.0 |
| Plasticizer | 5.0 | 5.0 | 5.0 |
| Sulfur | 1 | 1 | 1 |
| Accelerator | 0.75 | 0.75 | 0.75 |

The tensile properties (ASTM D412) and Shore A hardness (ASTM D2240) of the compounds of Table 2 are shown in Table 3 (room temperature) and Table 4 (100° C.).

TABLE 3

| Property | Control CB Sample 1 | Control rGO Sample | Sample A |
|---|---|---|---|
| Tensile Strength (Mpa) | 13.43 | 5.45 | 10.23 |
| Elongation at break (%) | 446 | 274 | 194 |
| 50% modulus (Mpa) | 1.25 | 1.39 | 2.66 |
| 100% modulus (Mpa) | 1.89 | 2.14 | 5.09 |
| Shore A hardness | 66 | 65 | 79 |

TABLE 4

| Property | Control CB Sample 1 | Control rGO Sample | Sample A |
|---|---|---|---|
| Tensile Strength (Mpa) | 8.7 | 5.14 | 8.45 |
| Elongation at break (%) | 363 | 273 | 176 |
| 50% modulus (Mpa) | 1.12 | 1.24 | 2.25 |
| 100% modulus (Mpa) | 1.72 | 1.98 | 4.49 |
| Shore A hardness | 63 | 58 | 72 |

It can be seen from Tables 3 and 4 that the tensile modulus of Sample A is more than twice of the modulus of Control CB Sample 1 at the same percent elongation, even though both samples have the same amount of total reinforcing additive. This increase in modulus can in turn increase rapid gas decompression resistance and extrusion resistance of o-rings made from this rubber composition. Moreover, the tensile strength of Sample A is much higher than the tensile strength of Control rGO Sample. Both samples have the same loading of rGO while Sample A has an additional 43.5 phr carbon blacks.

These observations may be explained in a comparison between the control samples. It can be seen that Control rGO Sample (0 carbon black content) has a higher tensile modulus than Control CB Sample 1 at the same percent elongation (43.5 phr carbon black) while the tensile strength of Control CB Sample 1 is greater than that of Control rGO Sample. This example highlights the synergistic effect of using graphene-based materials and carbon blacks as a dual reinforcing additive to enhance the tensile modulus of high temperature elastomers while keeping tensile strength of elastomer compounds at a high level.

Example 4: Compounds Comprising Fluoroelastomers (FKM)

Two types of graphene-based materials were used to form compounds with fluoroelastomers. Sample B comprises the reduced graphene oxide described in Example 1, and was prepared from the rGO/FKM masterbatch of Example 2. Sample C comprises mechanically produced graphene aggregates (Cabot Corporation) and was prepared by mixing FKM neat rubber (Viton® GF-600S fluoroelastomer from DuPont) with graphene aggregate powder (20 phr). For both Samples B and C, the carbon black used was ASTM N990 carbon black (Thermax® N990 carbon black from Cancarb Ltd.). The additional components were zinc oxide, Luperox® 101XL45 peroxide vulcanizing agent (Arkema) and DIAK® No. 7 curative co-agent (DuPont). The weight (g) of each added component is shown in Table 5.

TABLE 5

| Component | Control CB Sample 2 | Sample B | Sample C |
|---|---|---|---|
| FKM | 383.76 | 256.26 | 430.95 |
| rGO/FKM masterbatch | 0 | 135.80 | 0 |
| graphene aggregates | 0 | 0 | 43.0 |

TABLE 5-continued

| Component | Control CB Sample 2 | Sample B | Sample C |
|---|---|---|---|
| carbon black | 115.13 | 107.62 | 86.19 |
| ZnO | 11.51 | 11.53 | 12.93 |
| vulcanizing agent | 11.51 | 11.53 | 12.93 |
| curative co-agent | 11.51 | 11.53 | 12.93 |

Sample B was prepared by melt mixing the components as shown in Table 5. The mixing chamber of a C. W. Brabender Prep-Mixer with cam blades was first cooled to 20° C. by running cooling water through the chamber wall. The rGO/FKM masterbatch of Example 2 was fed into mixing chamber followed by the addition of the neat FKM. The masterbatch and neat FKM mixture were masticated for approximately 30 s at a mixing speed of 40 rpm. Carbon black (Thermax® N990 carbon black from Cancarb Ltd.) was added slowly to this mixture, and the mixture was masticated for approximately 2.5 min. Luperox® 101XL45 peroxide vulcanizing agent (Arkema) and DIAK® No. 7 curative co-agent (DuPont) were then added to the mixture and masticated for 2 min. The compound was removed from the chamber and milled into sheets (thickness of 0.25 in) using a two roll mill at 50° C.

Sample C was prepared in the same manner as Sample B without the use of a masterbatch. The mixing chamber of the C. W. Brabender Prep-Mixer was first cooled to 20° C. by running cooling water through the chamber wall. The neat FKM was fed into the mixing chamber and masticated for approximately 30 s at a mixing speed of 40 rpm. Graphene aggregates were then added slowly to the mixing chamber followed by slow addition of carbon blacks (Thermax® N990 carbon black from Cancarb Ltd.). This mixture was masticated for approximately 2.5 min. Luperox® 101XL45 peroxide vulcanizing agent (Arkema) and DIAK® No. 7 curative co-agent (DuPont) were then added to the mixture and masticated for 2 min. The compound was removed from the chamber and milled into sheets (thickness of 0.25 in) using a two-roll mill at 50° C.

Control CB Sample 2 was prepared in the same manner as Sample C without the addition of graphene aggregates. The mixing chamber of the C. W. Brabender Prep-Mixer was cooled to 20° C. by running cooling water through the chamber wall. The neat FKM was fed into mixing chamber and masticated for approximately 30 s at a mixing speed of 40 rpm. Carbon black (Thermax® N990 carbon black from Cancarb Ltd.) was added slowly, and the mixture was masticated for approximately 2.5 minutes. Luperox® 101XL45 peroxide vulcanizing agent (Arkema) and DIAK® No. 7 curative co-agent (DuPont) was then added to the mixing chamber, and the mixture was masticated for 2 minutes. The compound was removed from the chamber and milled into sheets (thickness of 0.25 in) using a two-roll mill at 50° C.

The compounds were molded and cured into 6 in×6 in square sheets by using a hydraulic press at 157° C. with ram pressure of 2500 psi. The cured sheets were then post-cured in a ventilated oven at 232° C. for 2 h under a nitrogen purge.

FKM-containing compounds were prepared with the following as reinforcing fillers: carbon black only ("Control CB Sample 2"), and a mixture of carbon black and graphene-based material as described herein ("Sample B" and "Sample C"). The specific components are listed in Table 6 for each formulation where amounts are expressed as parts by weight per 100 parts of rubber.

TABLE 6

| Component | Control CB Sample 2 | Sample B | Sample C |
|---|---|---|---|
| FKM | 100 | 100 | 100 |
| rGO | 0 | 2 | — |
| graphene aggregates | — | — | 20 |
| carbon black | 30 | 28 | 10 |
| ZnO | 3 | 3 | 3 |
| vulcanizing agent | 3 | 3 | 3 |
| curative co-agent | 3 | 3 | 3 |

The tensile properties (ASTM D412) and Shore A hardness (ASTM D2240) at room temperature of the compounds of Table 6 are shown in Table 7.

TABLE 7

| Property | Control CB Sample 2 | Sample B | Sample C |
|---|---|---|---|
| Tensile Strength (Mpa) | 20.2 | 21.45 | 21.9 |
| Elongation at break (%) | 220 | 147 | 198 |
| 10% modulus (Mpa) | 0.85 | 1.7 | 1.38 |
| 50% modulus (Mpa) | 2.74 | 6.96 | 6.11 |
| Shore A hardness | 80 | 87 | 84 |

The tensile properties (ASTM D412) and tear strength at 200° C. (ASTM D624) of the compounds of Table 6 are shown in Table 8.

TABLE 8

| Property | Control CB Sample 2 | Sample B | Sample C |
|---|---|---|---|
| Tensile Strength (Mpa) | 2.93 | 5.1 | 4.36 |
| Elongation at break (%) | 78 | 78 | 77 |
| 10% modulus (Mpa) | 0.53 | 0.94 | 0.88 |
| 50% modulus (Mpa) | 1.99 | 3.5 | 3.17 |
| Tear strength, die B (N/mm) | 6.68 | 9.48 | 8.83 |

From Tables 7 and 8, it can be seen that the modulus of Sample B is 70% greater than the modulus of Control CB Sample 2 at the same elongation at both room temperature and high temperature even though both samples have the same total loading of reinforcing additives (30 phr). The tensile strength of Sample B is also 70% greater than the tensile strength of Control CB Sample 2 at 200° C. The tear strength of Sample B is 40% greater than the tear strength of Control CB Sample 2 at 200° C.

The modulus and tensile strength of Sample C are greater than the modulus and tensile strength of Control CB Sample 2 at both room temperature (Table 7) and high temperature (Table 8) even though both samples have the same total loading of reinforcing additives (30 phr). Moreover, the tear strength of Sample C is 30% greater than the tear strength of Control CB Sample 2 at 200° C.

These property enhancements discussed in the examples herein were achieved by using graphene-based material/carbon black mixtures. The enhancement of one or more of tensile and modulus properties, Shore A hardness, and improved tear strength can enhance performance of components made from the composition at both room temperature and high temperatures.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An elastomer compound comprising:
   at least one elastomer that is resistant to heat for 70 h at 100° C. such that the at least one elastomer exhibits at least one of the following properties selected from:
      (a) a change in durometer hardness of no more than 15 points,
      (b) a change in tensile strength of no more than 40%, and
      (c) a change in ultimate elongation of no more than 40%;
   at least one graphene-based material present in an amount ranging from 0.01 phr to 30 phr relative to the at least one elastomer, wherein the at least one graphene-based material is selected from reduced graphene oxides and has a BET surface area ranging from 200 to 800 m²/g and a carbon-to-oxygen atomic ratio ranges from 5:1 to 1000:1; and
   at least one carbon black present in an amount ranging from 15 phr to 150 phr relative to the at least one elastomer.

2. The compound of claim 1, wherein after being subjected to 100° C. for 70 h, the at least one elastomer exhibits each of the properties (a) to (c).

3. The compound of claim 1, wherein the at least one elastomer is selected from rubbers and polymers comprising at least one monomer selected from 1,3-butadiene, styrene, isoprene, isohutylene, 2,3-dialkyl-1,3-butadiene, acrylonitrile, ethylene, and propylene, where alkyl is selected from $C_1$-$C_6$ alkyls.

4. The compound of claim 1, wherein the amount of carbon black is greater than the amount of the at least one graphene-based material.

5. The compound of claim 1, wherein (a) the change in durometer hardness is no more than 10 points.

6. The compound of claim 1, wherein (b) the change in tensile strength is no more than 35%.

7. The compound of claim 1, wherein (c) the change in ultimate elongation is no more than 35%.

8. The compound of claim 1, wherein the at least one graphene-based material has a lateral domain size ranging from 10 nm to 10 µm.

9. The compound of claim 1, wherein the at least one carbon black has an oil absorption number ranging from 30 to 130 cm³/g determined according to ASTM D2414.

10. The compound of claim 1, wherein the at least one carbon black has an external surface area based on the statistical thickness method ranging from 3 to 200 m²/g determined according to ASTM D6556.

11. The compound of claim 1, wherein the at least one carbon black is selected from ASTM N330, ASTM N326, ASTM N339, ASTM N539, ASTM N550, ASTM N660, ASTM N774, and ASTM N990 carbon blacks.

12. The compound of claim 1, wherein the total loading of the at least one graphene-based material and the at least one carbon black ranges from 15 phr to 150 phr.

* * * * *